(12) United States Patent
Johnson (10) Patent No.: US 11,680,795 B1
(45) Date of Patent: Jun. 20, 2023

(54) GRADE-LEVELING TOOL

(71) Applicant: Clifford Johnson, Grand Ridge, FL (US)

(72) Inventor: Clifford Johnson, Grand Ridge, FL (US)

( * ) Notice: Subject to any disclaimer, the term of this patent is extended or adjusted under 35 U.S.C. 154(b) by 0 days.

(21) Appl. No.: 17/673,919

(22) Filed: Feb. 17, 2022

(51) Int. Cl.
*G01C 5/04* (2006.01)

(52) U.S. Cl.
CPC ...................... *G01C 5/04* (2013.01)

(58) Field of Classification Search
CPC .................... G01C 5/04; G01C 5/06
USPC ..................................... 33/365, 367
See application file for complete search history.

(56) References Cited

U.S. PATENT DOCUMENTS

| | | | |
|---|---|---|---|
| 1,488,749 A * | 4/1924 | Franz | G01C 5/04 33/367 |
| 1,566,174 A | 12/1925 | Tyler | |
| 2,789,365 A | 4/1957 | Houge | |
| 2,971,264 A | 2/1961 | Stanley | |
| 3,212,195 A * | 10/1965 | Heikki | G01C 5/04 33/315 |
| 3,816,947 A | 6/1974 | Taylor | |
| 4,297,791 A | 11/1981 | Mende | |
| 4,434,561 A | 3/1984 | Gaspar | |
| 4,769,918 A | 9/1988 | Price | |
| 4,991,302 A * | 2/1991 | Brewer | G01C 5/04 33/367 |
| D387,295 S | 12/1997 | Krikorian | |
| 5,937,529 A * | 8/1999 | Brewer | G01C 5/04 33/367 |
| 11,428,595 B2 * | 8/2022 | Hinderling | G01L 19/0092 |

FOREIGN PATENT DOCUMENTS

CA  1180549  1/1985

* cited by examiner

*Primary Examiner* — George B Bennett
(74) *Attorney, Agent, or Firm* — Kyle A. Fletcher, Esq.

(57) ABSTRACT

The grade-leveling tool is a measurement device. The grade-leveling tool forms a vertical barometer. The grade-leveling tool measures the difference between: a) a desired elevation from the ground at a specific location; and, b) the existing elevation of the ground. The grade-leveling tool is used to create a bed of level ground used for supporting a structure. The grade-leveling tool comprises a base structure, a reservoir structure, and a hose structure. The hose structure and the reservoir structure attach to the base structure. A fluidic connection is formed between the reservoir structure and the hose structure. The base structure elevates the reservoir structure and the hose structure above the ground.

14 Claims, 4 Drawing Sheets

GRADE-LEVELING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

11 The present invention relates to the field of hydrostatic levelling. (G0105/04)

SUMMARY OF INVENTION

The grade-leveling tool is a measurement device. The grade-leveling tool forms a vertical barometer. The grade-leveling tool measures the difference between: a) a desired elevation from the ground at a specific location; and, b) the existing elevation of the ground. The grade-leveling tool is used to create a bed of level ground used for supporting a structure. The grade-leveling tool comprises a base structure, a reservoir structure, and a hose structure. The hose structure and the reservoir structure attach to the base structure. A fluidic connection is formed between the reservoir structure and the hose structure. The base structure elevates the reservoir structure and the hose structure hose structure above the ground.

To use the grade-leveling tool, the reservoir structure and the hose structure are filled with a working fluid. The grade-leveling tool is placed in a fixed position. The base structure changes the elevations of the reservoir structure and the hose structure to a desired location. A transparent hose is paid out from the hose structure. Any atmospheric gases are expelled from the working fluid contained within the transparent hose and the transparent hose is then capped. The reservoir is then opened to the atmosphere to form the vertical barometer. The headroom between the working fluid and the closed end of the transparent hose is marked such that the identical elevation can be identified throughout the reach of the transparent hose.

These together with additional objects, features and advantages of the grade-leveling tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the grade-leveling tool in detail, it is to be understood that the grade-leveling tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grade-leveling tool.

It is therefore important that the claims be regarded as including such equivalent construction insofar as they do not depart from the spirit and scope of the grade-leveling tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
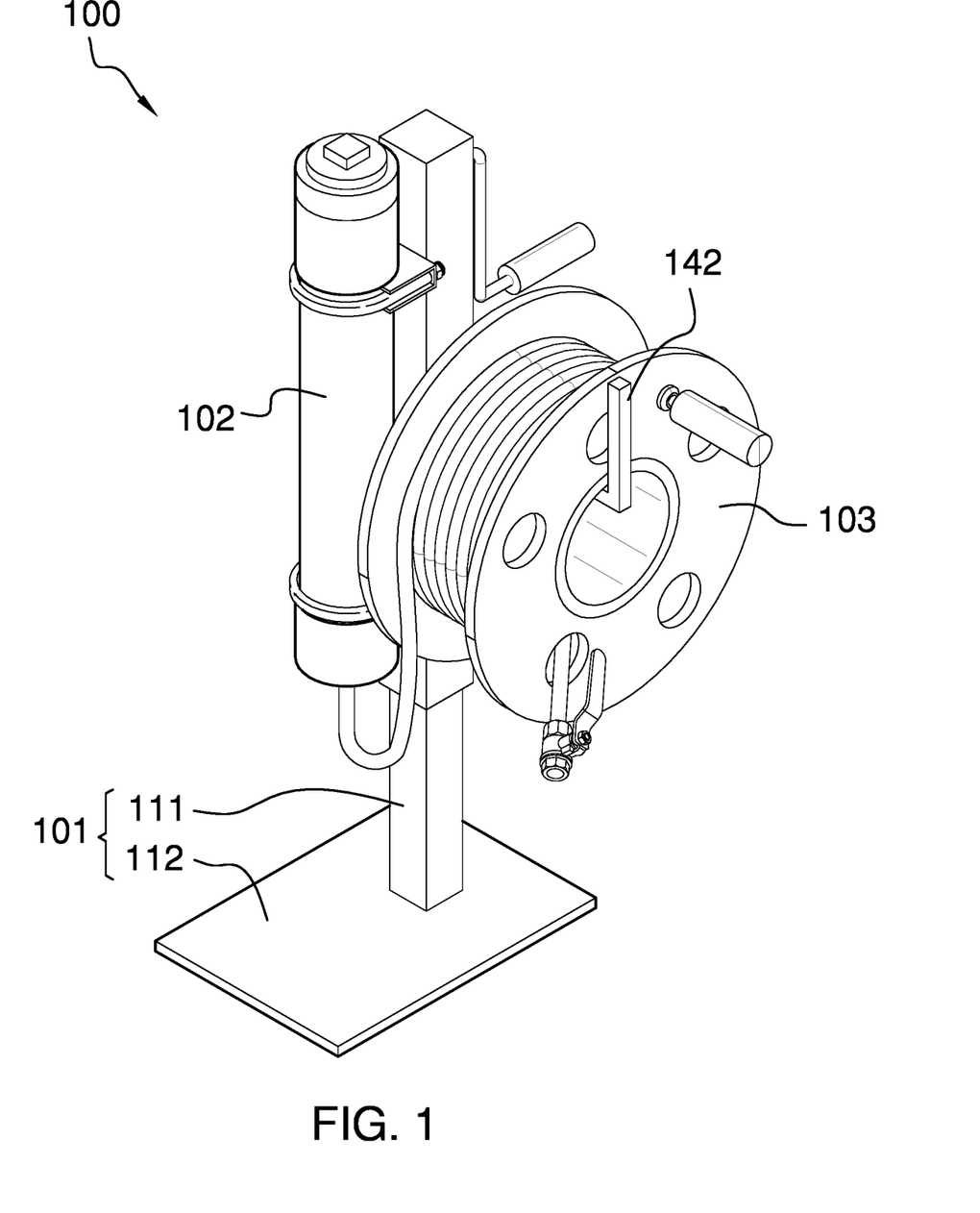
FIG. 1 is a perspective view of an embodiment of the disclosure.
Figure 2:
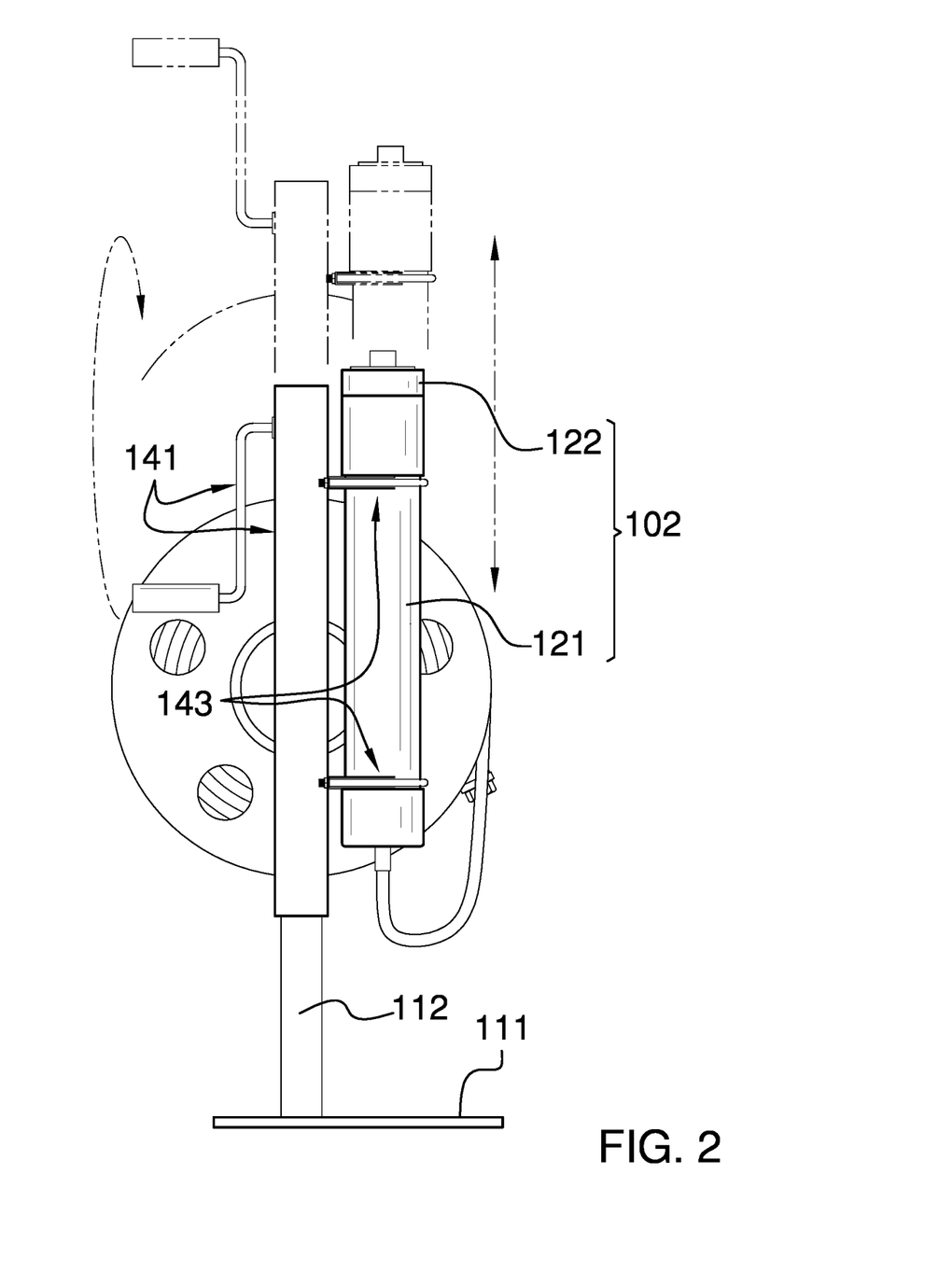
FIG. 2 is a rear view of an embodiment of the disclosure.
Figure 3:
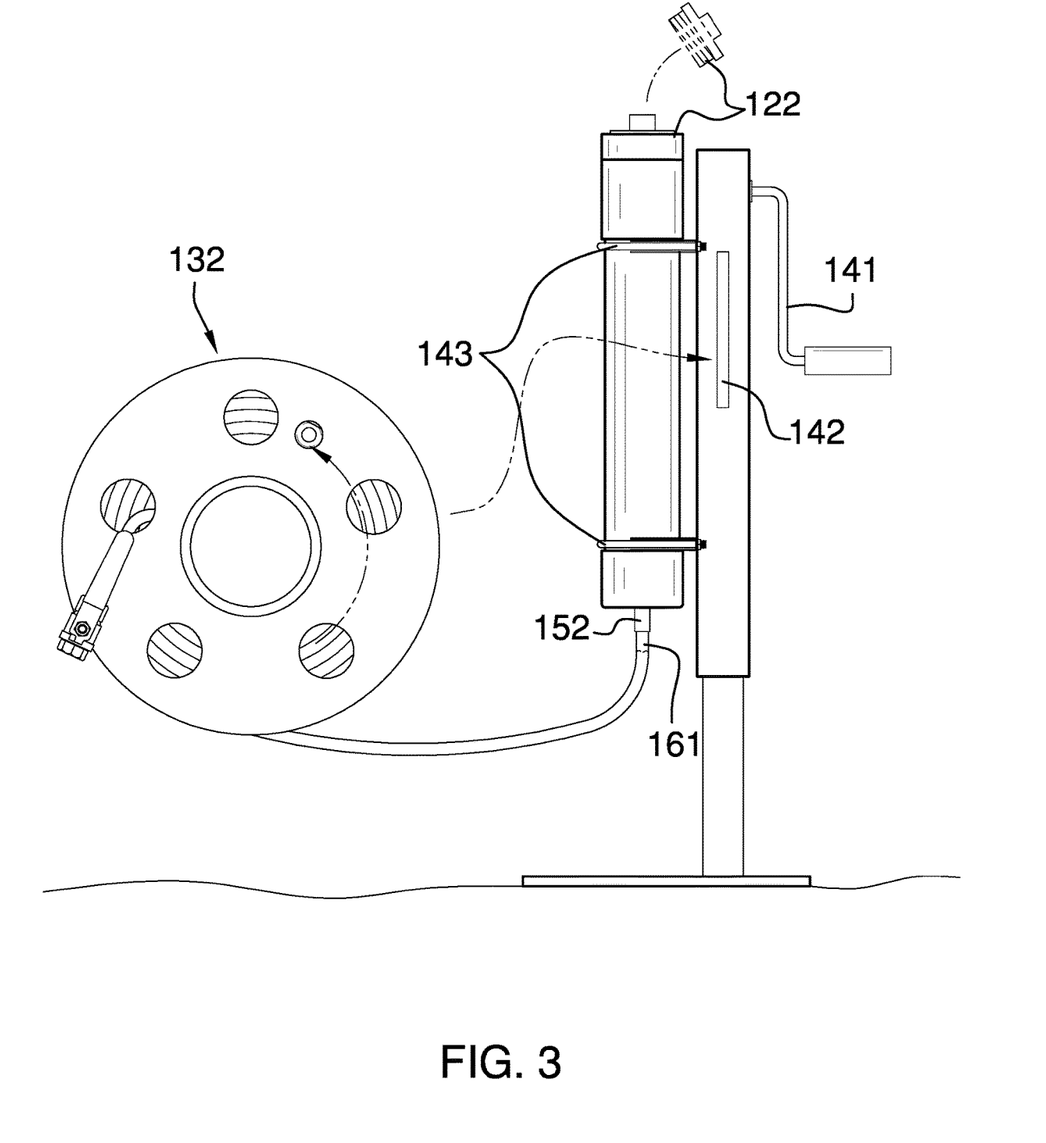
FIG. 3 is a front view of an embodiment of the disclosure.
Figure 4:
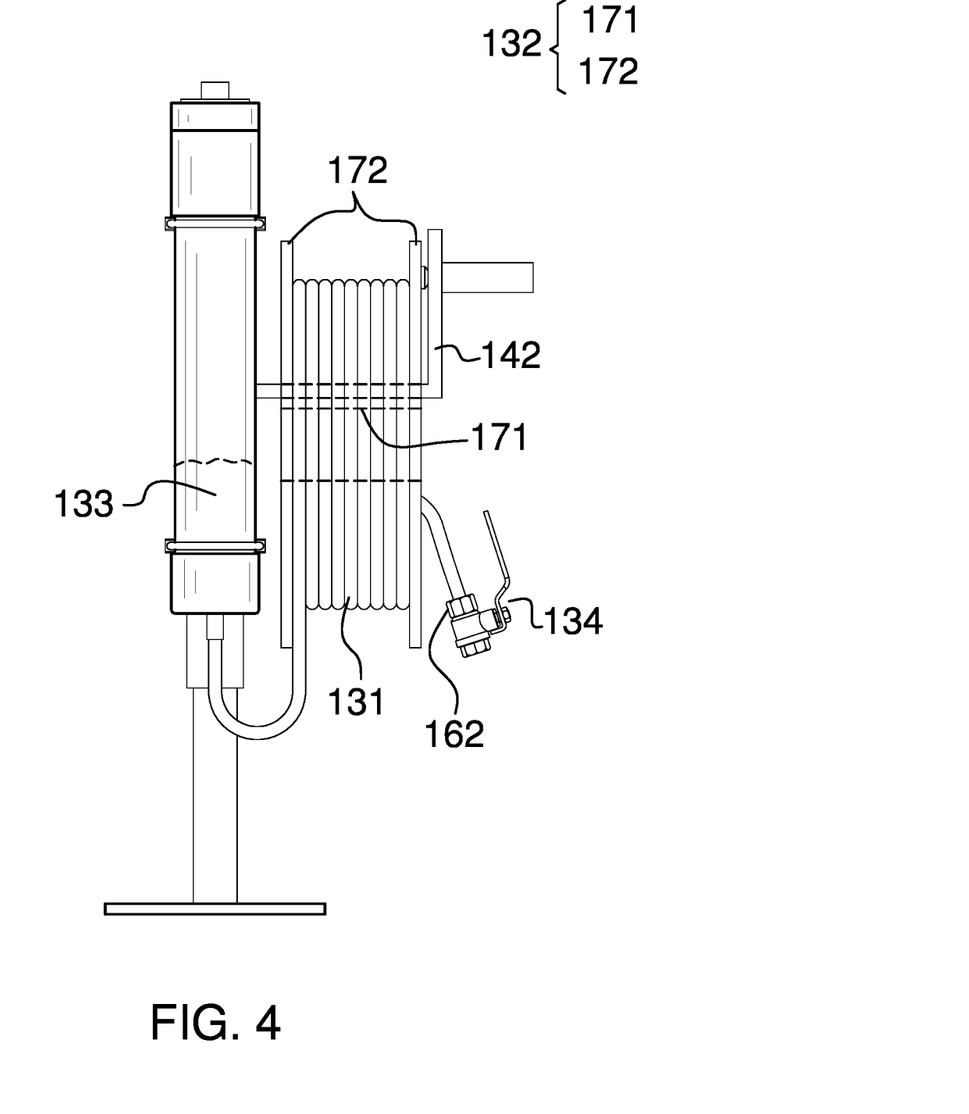
FIG. 4 is a side view of an embodiment of the disclosure.

Detailed reference will now be made to one or more potential embodiments of the disclosure, which are illustrated in FIGS. 1 through 4.

The grade-leveling tool 100 (hereinafter invention) is a measurement device. The invention 100 forms a vertical barometer. The invention 100 measures the difference between: a) a desired elevation from the ground 104 at a specific location; and, b) the existing elevation of the ground 104. The invention 100 is used to create a bed of level ground 104 used for supporting a structure. The invention 100 comprises a base structure 101, a reservoir structure 102, and a hose structure 103. The hose structure 103 and the reservoir structure 102 attach to the base structure 101. A fluidic connection is formed between the reservoir structure 102 and the hose structure 103. The base structure 101 elevates the reservoir structure 102 and the hose structure 103 above the ground 104. The ground 104 is defined elsewhere in this disclosure.

To use the invention 100, the reservoir structure 102 and the hose structure 103 are filled with a working fluid 133. The invention 100 is placed in a fixed position. The base structure changes the elevations of the reservoir structure 102 and the hose structure 103 to a desired location. A transparent hose 131 is paid out from the hose structure 103.

Any atmospheric gases are expelled from the working fluid 133 contained within the transparent hose 131 and the transparent hose 131 is then capped. The reservoir structure 102 is then opened to the atmosphere to form the vertical barometer. The headroom between the working fluid 133 and the closed end of the transparent hose 131 is marked such that the identical elevation can be identified throughout the reach of the transparent hose 131.

The base structure 101 is a mechanical structure. The base structure 101 is a load bearing structure. The reservoir structure 102 and the hose structure 103 attach to the base structure 101. The base structure 101 transfers the loads of the reservoir structure 102 and the hose structure 103 to the ground 104. The base structure 101 elevates the reservoir structure 102 and the hose structure 103 above the ground 104. The base structure 101 is an adjustable structure. By adjustable is meant that the elevation at which the base structure 101 holds the reservoir structure 102 and the hose structure 103 is adjustable. The base structure 101 comprises a jack structure 111 and a pedestal plate 112.

The jack structure 111 is a mechanical structure. The jack structure 111 forms a stanchion that elevates the reservoir structure 102 and the hose structure 103 above the ground 104. The jack structure 111 is a roughly prism shaped structure. The jack structure 111 forms the adjustable mechanism of the base structure 101 that changes the elevation of both the reservoir structure 102 and the hose structure 103 relative to the ground 104. The jack structure 111 forms a load path that transfers the loads of the reservoir structure 102 and the hose structure to the pedestal plate 112. The jack structure 111 comprises a jack mechanism 141, a spool structure 132 mount 142, and a reservoir structure 102 mount 143.

The jack mechanism 141 forms the stanchion structure of the base structure 101. The reservoir structure 102 and the hose structure 103 attach to the jack mechanism 141. The jack mechanism 141 forms the vertically oriented load bearing structure that elevates the reservoir structure 102 and the hose structure 103 above the ground 104. The jack mechanism 141 physically transfers the loads of the reservoir structure 102 and the hose structure 103 to the pedestal plate 112. The jack mechanism 141 forms a jack. The jack mechanism 141 mechanically adjusts the elevation of the reservoir structure 102 and the hose structure 103 above the ground 104.

The spool structure 132 mount 142 is a mount. The spool structure 132 mount 142 physically attaches the hose structure 103 to the lateral face of the jack mechanism 141. The spool structure 132 mount 142 transfers the load of the hose structure 103 to the jack mechanism 141. The reservoir structure 102 mount 143 is a mount. The reservoir structure 102 mount 143 physically attaches the reservoir structure 102 to the lateral face of the jack mechanism 141. The reservoir structure 102 mount 143 transfers the load of the reservoir structure 102 to the jack mechanism 141.

The pedestal plate 112 is a disk shaped structure. The pedestal plate 112 forms the structure of the base structure 101 that rests on the ground 104. A congruent end of the disk structure of the pedestal plate 112 is placed in contact with the ground 104. The jack structure 111 attaches to the congruent end of the pedestal plate 112 that is distal from the ground 104. The jack structure 111 attaches to the pedestal plate 112 such that the center axis of the prism structure of the jack structure 111 projects perpendicularly away from the congruent end of the pedestal plate 112. The jack structure 111 attaches to the pedestal plate 112 such that the center axis of the prism structure of the jack structure 111 aligns with the center of the pedestal plate 112.

The reservoir structure 102 is a reservoir. The reservoir structure 102 forms the reservoir of the vertical barometer formed by the invention 100. The vertical barometer is described elsewhere in this disclosure. The reservoir structure 102 contains and stores the working fluid 133. The working fluid 133 is introduced into the invention 100 through the reservoir structure 102. The reservoir structure 102 forms a fluidic connection with the hose structure 103. The reservoir structure 102 feeds the working fluid 133 into the hose structure 103. The reservoir structure 102 receives any excess volume of working fluid 133 from the hose structure 103 for storage. The reservoir structure 102 comprises a pan structure and a cap structure 122.

The pan structure 121 is a prism shaped structure. The pan structure 121 is a hollow structure. The pan structure 121 is a pan shaped structure. The pan structure 121 forms the reservoir of the vertical barometer structure of the invention 100. The pan structure 121 forms a container that receives and stores the working fluid 133. The pan structure 121 forms the fluidic connection with the hose structure 103. The open face of the pan structure 121 provides access into the hollow interior of the pan structure 121. The open face of the pan structure 121 provides the atmosphere access to the working fluid 133 contained in the pan structure 121. The pan structure 121 further comprises an inferior fitting 152. The inferior fitting 152 is a fitting. The inferior fitting 152 installs in the closed face of the pan structure 121. The inferior fitting 152 forms the physical fluidic connection between the pan structure 121 and the hose structure 103.

The cap structure 122 is the mechanical structure that encloses the open face of the pan structure 121. The cap structure 122 forms a fluid impermeable seal with the open face of the pan structure 121. The cap structure 122 attaches to the pan structure 121 using a threaded connection.

The hose structure 103 is a fluidic transport structure. The hose structure 103 forms the capped tube structure of the vertical barometer formed by the invention 100. The vertical barometer is described elsewhere in this disclosure. The hose structure 103 forms a fluidic connection with the reservoir structure 102. The hose structure 103 receives the working fluid 133 from the reservoir structure 102. The hose structure 103 transports the working fluid 133 to a position located within the reach of the transparent hose 131 of the hose structure 103. The hose structure 103 is a transparent structure. The transparent nature of the hose structure 103 allows the headroom of the working fluid 133 to be seen and measured at the selected position located within the reach of the transparent hose 131 of the hose structure 103. The hose structure 103 comprises a transparent hose 131 and a spool structure 132.

The transparent hose 131 is a hose. The hose is defined elsewhere in this disclosure. The transparent hose 131 forms the capped tubular structure of the vertical barometer structure of the invention 100. The transparent hose 131 is a flexible structure. The transparent hose 131 is formed from a flexible transparent material. The transparent hose 131 further comprises a release valve 134, a reservoir fitting 161, and a free end fitting 162.

The transparent hose 131 is formed with a free end and a fixed end. The free end of the transparent hose 131 discharges the working fluid 133 into the release valve 134. The fixed end of the transparent hose 131 receives the working fluid 133 from the pan structure 121. The reservoir fitting 161 is a fitting that mounts on the fixed end of the transparent hose 131. The reservoir fitting 161 forms the physical fluidic connection between the transparent hose 131 and the inferior fitting 152. The free end fitting 162 is a fitting that mounts on the free end of the transparent hose 131. The free end fitting 162 forms the physical fluidic connection between the transparent hose 131 and the release valve 134.

The release valve 134 is a valve that attaches to the free end fitting 162. The release valve 134 encloses the free end fitting 162 such that the transparent hose 131 will function as a closed tubular structure during the use of the invention 100. The release valve 134 opens the free end fitting 162 to the atmosphere to allow for the purging of atmospheric gases from the transparent hose 131 when necessary.

The spool structure 132 forms a spool. The spool is defined elsewhere in this disclosure. The spool structure 132 forms a storage space on which the transparent hose 131 is wound. The transparent hose 131 deploys from the spool structure 132 such that the reach between the free end of the transparent hose 131 and the reservoir structure 102 can increase. The transparent hose 131 retracts onto the spool structure 132 such that the reach between the free end of the transparent hose 131 and the reservoir structure 102 can decrease. The spool structure 132 physically attaches to the spool structure 132 mount 142 of the jack structure 111.

The spool structure 132 further comprises an inner core 171 and a plurality of flanges 172. The inner core 171 is a disk shaped structure. The transparent hose 131 is wound on the lateral face of the disk structure of the inner core 171. Each flange selected from the plurality of flanges 172 attaches to a congruent end of the disk structure of the inner core 171 to form a composite prism structure. Each flange selected from the plurality of flanges 172 forms a mechanical barrier that prevents the transparent hose 131 from falling off the lateral face of the disk structure of the inner core 171.

The working fluid 133 is a liquid phase chemical compound. The working fluid 133 forms the working fluid 133 of the vertical barometer structure of the invention 100. The working fluid 133 is contained within the reservoir structure 102 and the hose structure 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barometer: As used in this disclosure, a barometer is a measurement device used to measure the atmospheric pressure. There are several known methods for measuring atmospheric pressure. A simple example of a barometer is the vertical barometer. The vertical barometer comprises a working fluid, a reservoir, and a capped tubular structure. The working fluid fills the capped tubular structure. The working fluid is contained in the reservoir such that the working fluid in the reservoir is exposed to the atmosphere. The surface area of the working fluid that is exposed to the atmosphere is less than the surface area of the open end of the capped tubular structure. The open end of the capped tubular structure inserts into the working fluid contained in the reservoir such that such that no atmospheric gas is contained within the tubular structure. The surface area of the working fluid that is exposed to the atmosphere is less than the surface area of the open end of the capped tubular structure. The difference in the surface areas of the capped tubular structure and the surface area of the working fluid creates a difference between the actions of the atmospheric pressure on the working fluid in the reservoir and the action of the force of gravity on the working fluid in the capped tubular structure such that the elevation of the working fluid in the capped tubular structure is a known function of, and can be used to measure, the atmospheric pressure. The barometer can also measure the elevation of an object.

Bed: As used in this disclosure, a bed refers to a horizontally oriented surface that forms the supporting surface for a load.

Cant: As used in this disclosure, a cant is an angular deviation from one or more reference lines (or planes) such as a vertical line (or plane) or a horizontal line (or plane).

Cap: As used in this disclosure, a cap is a protective structure that encloses a space, opening, or fitting.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Color: As used in this disclosure, a color refers to the visible portion of the spectrum that is reflected off of an object that is exposed to an external source of electromagnetic radiation. A color is often referred to as a shade.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Crank: As used in this disclosure, a crank is a handle or an arm that is attached perpendicularly to the axis of rotation of a shaft and that is used for transmitting rotary motion to the shaft.

Crankshaft: As used in this disclosure, a crankshaft is a cylindrical rod or shaft that: 1) is designed to rotate around its center axis; and 2) is driven by a crank.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Dye: As used in this disclosure, a dye is a chemical composition used to change the color of an object. The verb to dye refers to the use of one or more dyes to create a hue on an object.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fitting: As used in this disclosure, a fitting is a component that attaches a first object to a second object. The fitting is used to form a fluidic connection between the first object and the second object.

Flange: As used in this disclosure, a flange is a protruding rib, edge, or collar that is used to hold an object in place or to attach a first object to a second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity.

Headroom: As used in this disclosure, headroom refers to the vertical space between the superior surface or boundary of a container and an object stored within the container.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Hue: As used in this disclosure, a hue refers to a specific color.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Jack: As used in this disclosure, a jack is a mechanical device for lifting loads by means of a force applied with a lever, screw, or hydraulic press. A jack is also called a lift.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it. The flow of a plasma through the atmosphere is called an arc. An arc is generally created when the atmosphere is subjected to an electric field that ionizes the molecules forming the atmosphere.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Reservoir: As used in this disclosure, a reservoir refers to a container or containment system that is configured to store a fluid.

Solid: As used in this disclosure, a solid refers to a state (phase) of matter that: 1) has a fixed volume; and, 2) does not flow.

Spool: As used in this disclosure, a spool is a cylindrical device upon which a flexible material, including but not limited to a sheeting, yarn, a cord, or a tape, can be wound. Depending on context, a spool may also contain the flexible material stored upon the spool.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Transparent: As used in this disclosure, transparent refers to a material that allows light to pass through the material without significant scattering such that an object can be clearly seen through the material.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Valve: As used in this disclosure, a valve is a device that is used to control the flow of a fluid (gas or liquid) through a pipe, tube, or hose.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A grade-leveling tool comprising
a base structure, a reservoir structure, and a hose structure;
wherein the hose structure and the reservoir structure attach to the base structure;
wherein a fluidic connection is formed between the reservoir structure and the hose structure.

2. The grade-leveling tool according to claim 1
wherein the grade-leveling tool is a measurement device;
wherein the grade-leveling tool forms a vertical barometer;
wherein the grade-leveling tool measures the difference between: a) a desired elevation from the ground at a specific location; and, b) the existing elevation of the ground;
wherein the grade-leveling tool creates a bed of level ground.

3. The grade-leveling tool according to claim 2
wherein the base structure is a mechanical structure;
wherein the base structure is a load bearing structure;
wherein the base structure transfers the loads of the reservoir structure and the hose structure to the ground;
wherein the base structure elevates the reservoir structure and the hose structure above the ground;
wherein the base structure is an adjustable structure;
wherein by adjustable is meant that the elevation at which the base structure holds the reservoir structure and the hose structure is adjustable.

4. The grade-leveling tool according to claim 3
wherein the reservoir structure is a reservoir;
wherein the reservoir structure forms the reservoir of the vertical barometer formed by the grade-leveling tool;
wherein the reservoir structure contains and stores the working fluid;
wherein the working fluid is introduced into the grade-leveling tool through the reservoir structure;
wherein the reservoir structure forms a fluidic connection with the hose structure;
wherein the reservoir structure feeds the working fluid into the hose structure;
wherein the reservoir structure receives any excess volume of working fluid from the hose structure for storage.

5. The grade-leveling tool according to claim 4
wherein the hose structure is a fluidic transport structure;
wherein the hose structure forms the capped tube structure of the vertical barometer formed by the grade-leveling tool;
wherein the hose structure forms a fluidic connection with the reservoir structure;
wherein the hose structure receives the working fluid from the reservoir structure;
wherein the hose structure transports the working fluid to a position located within the reach of the transparent hose of the hose structure;
wherein the hose structure is a transparent structure;
wherein the transparent nature of the hose structure allows the headroom of the working fluid to be seen and measured at the selected position located within the reach of the transparent hose of the hose structure.

6. The grade-leveling tool according to claim 5
wherein the base structure comprises a jack structure and a pedestal plate;
wherein the jack structure attaches to the pedestal plate.

7. The grade-leveling tool according to claim 6
wherein the reservoir structure comprises a pan structure and a cap structure;
wherein the cap structure controls access into the pan structure.

8. The grade-leveling tool according to claim 7
wherein the hose structure comprises a transparent hose and a spool structure;
wherein the transparent hose is a hose;
wherein the transparent hose forms the capped tubular structure of the vertical barometer structure of the grade-leveling tool;
wherein the transparent hose is a flexible structure;
wherein the transparent hose is formed from a flexible transparent material;
wherein the spool structure forms a spool;
wherein the spool structure forms a storage space on which the transparent hose is wound;
wherein the transparent hose deploys from the spool structure such that the reach between the free end of the transparent hose and the reservoir structure can increase;
wherein the transparent hose retracts onto the spool structure such that the reach between the free end of the transparent hose and the reservoir structure can decrease;
wherein the spool structure physically attaches to the spool structure mount of the jack structure.

9. The grade-leveling tool according to claim 8
wherein the jack structure is a mechanical structure;
wherein the jack structure forms a stanchion that elevates the reservoir structure and the hose structure above the ground;
wherein the jack structure is a roughly prism shaped structure;
wherein the jack structure forms the adjustable mechanism of the base structure that changes the elevation of both the reservoir structure and the hose structure relative to the ground;
wherein the jack structure forms a load path that transfers the loads of the reservoir structure and the hose structure to the pedestal plate.

10. The grade-leveling tool according to claim 9
wherein the pedestal plate is a disk shaped structure;
wherein the pedestal plate forms the structure of the base structure that rests on the ground;
wherein a congruent end of the disk structure of the pedestal plate is placed in contact with the ground;
wherein the jack structure attaches to the congruent end of the pedestal plate that is distal from the ground;
wherein the jack structure attaches to the pedestal plate such that the center axis of the prism structure of the jack structure projects perpendicularly away from the congruent end of the pedestal plate;
wherein the jack structure attaches to the pedestal plate such that the center axis of the prism structure of the jack structure aligns with the center of the pedestal plate.

11. The grade-leveling tool according to claim 10
wherein the pan structure is a prism shaped structure;
wherein the pan structure is a hollow structure;
wherein the pan structure is a pan shaped structure;
wherein the pan structure forms the reservoir of the vertical barometer structure of the grade-leveling tool;
wherein the pan structure forms a container that receives and stores the working fluid;
wherein the pan structure forms the fluidic connection with the hose structure;
wherein the open face of the pan structure provides access into the hollow interior of the pan structure;
wherein the open face of the pan structure provides the atmosphere access to the working fluid contained in the pan structure;
wherein the pan structure further comprises an inferior fitting;
wherein the inferior fitting is a fitting;
wherein the inferior fitting installs in the closed face of the pan structure;
wherein the inferior fitting forms the physical fluidic connection between the pan structure and the hose structure.

12. The grade-leveling tool according to claim 11
wherein the cap structure is the mechanical structure that encloses the open face of the pan structure;
wherein the cap structure forms a fluid impermeable seal with the open face of the pan structure;
wherein the cap structure attaches to the pan structure using a threaded connection.

13. The grade-leveling tool according to claim 12
wherein the transparent hose further comprises a release valve, a reservoir fitting, and a free end fitting;
wherein the transparent hose is formed with a free end and a fixed end;
wherein the free end of the transparent hose discharges the working fluid into the release valve;
wherein the fixed end of the transparent hose receives the working fluid from the pan structure;
wherein the reservoir fitting is a fitting that mounts on the fixed end of the transparent hose;
wherein the reservoir fitting forms the physical fluidic connection between the transparent hose and the inferior fitting;
wherein the free end fitting is a fitting that mounts on the free end of the transparent hose;
wherein the free end fitting forms the physical fluidic connection between the transparent hose and the release valve;
wherein the release valve is a valve that attaches to the free end fitting;
wherein the release valve encloses the free end fitting such that the transparent hose will function as a closed tubular structure during the use of the grade-leveling tool;
wherein the release valve opens the free end fitting to the atmosphere to allow for the purging of atmospheric gases from the transparent hose when necessary.

14. The grade-leveling tool according to claim 13
wherein the jack structure comprises a jack mechanism, a spool structure mount, and a reservoir structure mount;
wherein the spool structure mount and the reservoir structure mount attach to the jack mechanism;
wherein the jack mechanism forms the stanchion structure of the base structure;
wherein the reservoir structure and the hose structure attach to the jack mechanism;
wherein the jack mechanism forms the vertically oriented load bearing structure that elevates the reservoir structure and the hose structure above the ground;
wherein the jack mechanism physically transfers the loads of the reservoir structure and the hose structure to the pedestal plate;
wherein the jack mechanism forms a jack;
wherein the jack mechanism mechanically adjusts the elevation of the reservoir structure and the hose structure above the ground;
wherein the spool structure mount is a mount;
wherein the spool structure mount physically attaches the hose structure to the lateral face of the jack mechanism;
wherein the spool structure mount transfers the load of the hose structure to the jack mechanism;
wherein the reservoir structure mount is a mount;
wherein the reservoir structure mount physically attaches the reservoir structure to the lateral face of the jack mechanism;
wherein the reservoir structure mount transfers the load of the reservoir structure to the jack mechanism.

* * * * *